US009110988B1

(12) United States Patent
Tan

(10) Patent No.: US 9,110,988 B1
(45) Date of Patent: Aug. 18, 2015

(54) METHODS, SYSTEMS, AND MEDIA FOR AGGREGATING AND PRESENTING MULTIPLE VIDEOS OF AN EVENT

(71) Applicant: Google Inc., Mountain View, CA (US)

(72) Inventor: Weihua Tan, San Mateo, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/827,600

(22) Filed: Mar. 14, 2013

(51) Int. Cl.
*H04N 9/80* (2006.01)
*G06F 17/30* (2006.01)

(52) U.S. Cl.
CPC .............................. *G06F 17/30784* (2013.01)

(58) Field of Classification Search
None
See application file for complete search history.

(56) References Cited

U.S. PATENT DOCUMENTS

| 7,725,015 | B2 | 5/2010 | Tanoue |
| 2005/0193421 | A1 | 9/2005 | Cragun |
| 2008/0127270 | A1* | 5/2008 | Shipman et al. ................. 725/46 |
| 2010/0086276 | A1* | 4/2010 | Sproule et al. .................. 386/52 |

* cited by examiner

*Primary Examiner* — Heather Jones
(74) *Attorney, Agent, or Firm* — Byrne Poh LLP

(57) ABSTRACT

Methods, systems, and media for aggregating and presenting multiple videos of an event are provided. In some implementations, a method for identifying related video content is provided, the method comprising: receiving a first video and first video metadata that describes the first video from a first camera device; receiving a second video and second video metadata that describes the second video from a second camera device; comparing the first video metadata and the second video metadata; determining whether the first video and the second video are associated with an event based on the comparison; in response to determining that the first video and the second video are associated with the event, grouping the first video and second video into a plurality of videos associated with the event; and causing the plurality of videos to be displayed to a viewer based on the viewer requesting at least one of the plurality of videos.

24 Claims, 6 Drawing Sheets

METHODS, SYSTEMS, AND MEDIA FOR AGGREGATING AND PRESENTING MULTIPLE VIDEOS OF AN EVENT

TECHNICAL FIELD

The disclosed subject matter relates to methods, systems, and media for aggregating and presenting multiple videos of an event.

BACKGROUND

When an event takes place, many users may capture the event using a camera device, such as a mobile device that includes a camera for capturing videos. These users may also upload the resulting video to a video sharing and/or video hosting service, where the video can be shared and watched by others. When a viewer sees a video of an event that they are interested in using the video sharing or video hosting service, the viewer may wish to see the event from another angle, obtain additional details about the event, or view a higher quality version of the event. In order to accomplish this, a viewer typically is required to search through all of the videos on the video sharing and/or video hosting service to attempt to find another video of the same event. This can be difficult as the number of videos available may be in the millions and the viewer may be required to input search terms and other criteria, and then examine and filter the search results to find videos that are of the same event. This can be time consuming and difficult for a viewer and may cause the viewer to become frustrated and, in some cases, cause the viewer to stop searching.

Accordingly, it is desirable to provide methods, systems, and media for aggregating and presenting multiple videos of an event.

SUMMARY

In accordance with various embodiments of the disclosed subject matter, methods, systems, and media for aggregating video of an event are provided.

In accordance with some embodiments of the disclosed subject matter, a method for aggregating and presenting multiple videos of an event is provided, the method comprising: receiving, using a hardware processor, a first video and first video metadata from a first camera device; receiving a second video and second video metadata from a second camera device; comparing the first video metadata and the second video metadata; determining whether the first video and the second video are associated with an event based on the comparison; in response to determining that the first video and the second video are associated with the event, grouping the first video and second video into a plurality of videos associated with the event; and causing the plurality of videos to be displayed to a viewer based on the viewer requesting at least one of the plurality of videos.

In some embodiments, comparing the first video metadata and the second video metadata further comprises comparing location information and timing information associated with the first video and the second video.

In some embodiments, determining that the first video and the second video are associated with the event further comprises: determining a first similarity score between the timing information of the first video and the timing information of the second video; and determining a second similarity score between the location information of the first video and the location information of the second video.

In some embodiments, the location information includes coordinates and a compass direction at which a video was captured.

In some embodiments, determining that the first video and the second video are associated with the event further comprises determining a similarity score between a portion of audio corresponding to the first video and a portion of audio corresponding to the second video.

In some embodiments, determining that the first video and the second video are associated with the event further comprises determining a similarity score between a brightness level corresponding to a portion of the first video and a brightness level corresponding to a portion of the second video.

In some embodiments, comparing the first video metadata and the second video metadata further comprises comparing title information contained in the first video metadata and the second video metadata, and wherein determining that the first video and the second video are associated with the event further comprises determining a similarity score between the title information of the first video and the title information of the second video.

In some embodiments, the method further comprises comparing at least one of the first video metadata and the second video metadata with event metadata, wherein a plurality of videos are associated with the event and the event metadata describes the plurality of videos based on video metadata received in connection with each of the plurality of videos.

In accordance with some embodiments of the disclosed subject matter, a system for aggregating and presenting multiple videos is provided, the system comprising: at least one hardware processor that is configured to: receive a first video and first video metadata from a first camera device; receive a second video and second video metadata from a second camera device; compare the first video metadata and the second video metadata; determine whether the first video and the second video are associated with an event based on the comparison; group the first video and second video into a plurality of videos associated with the event in response to determining that the first video and the second video are associated with the event; and cause the plurality of videos to be displayed to a viewer based on the viewer requesting at least one of the plurality of videos.

In accordance with some embodiments of the disclosed subject matter, a system for aggregating and presenting multiple videos is provided, the system comprising: means for receiving a first video and first video metadata from a first camera device; means for receiving a second video and second video metadata from a second camera device; means for comparing the first video metadata and the second video metadata; means for determining whether the first video and the second video are associated with an event based on the comparison; means for grouping the first video and second video into a plurality of videos associated with the event in response to determining that the first video and the second video are associated with the event; and means for causing the plurality of videos to be displayed to a viewer based on the viewer requesting at least one of the plurality of videos.

In some embodiments, the system further comprises means for comparing location information and timing information.

In some embodiments, the system further comprises: means for determining a first similarity score between the timing information of the first video and the timing information of the second video; and means for determining a second similarity score between the location information of the first video and the location information of the second video.

In some embodiments, the location information includes coordinates and a compass direction at which a video was captured.

In some embodiments, the system further comprises means for determining a similarity score between a portion of audio corresponding to the first video and a portion of audio corresponding to the second video.

In some embodiments, the system further comprises means for determining a similarity score between a brightness level corresponding to a portion of the first video and a brightness level corresponding to a portion of the second video.

In some embodiments, the system further comprises: means for comparing title information contained in the first video metadata and the second video metadata; and means for determining a similarity score between the title information of the first video and the title information of the second video.

In some embodiments, the system further comprises means for comparing at least one of the first video metadata and the second video metadata with event metadata, wherein a plurality of videos are associated with the event and the event metadata describes the plurality of videos based on video metadata received in connection with each of the plurality of videos.

In accordance with some embodiments of the disclosed subject matter, non-transitory computer-readable medium containing computer executable instructions that, when executed by a processor, cause the processor to perform a method for aggregating and presenting multiple videos is provided, the method comprising: receiving a first video and first video metadata from a first camera device; receiving a second video and second video metadata from a second camera device; comparing the first video metadata and the second video metadata; determining whether the first video and the second video are associated with an event based on the comparison; in response to determining that the first video and the second video are associated with the event, grouping the first video and second video into a plurality of videos associated with the event; and causing the plurality of videos to be displayed to a viewer based on the viewer requesting at least one of the plurality of videos.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which include methods, systems, and media) for aggregating and presenting multiple videos of an event are provided.

In some embodiments, when videos are received at a video sharing and/or video hosting service, these mechanisms can determine whether any of the received videos depict the same event. Videos that are determined by the mechanisms to depict the same event can be associated with the event and/or with the other videos depicting that same event. It should be noted that the received videos can include, for example, a live video feed being captured by a mobile device or a wearable computing device, or a recorded video that was previously captured by a mobile device, a wearable computing device, or any other suitable device having a camera.

In some embodiments, in response to receiving a video, the mechanisms can compare video metadata (e.g., timing information, location information, direction information, etc.) corresponding to the video and/or video data (e.g., images in the video, audio data contained in the video, etc.) of the video to determine whether two or more videos depict the same event.

If two or more videos depict the same event, the videos can be grouped such that when one of the videos is requested by a viewer (e.g., a person and/or device that requests presentation of a video from the video sharing and/or video hosting service), the viewer can be provided with the opportunity to view multiple videos that have been determined to depict the same event.

These mechanisms can be used in a variety of applications. For example, these mechanisms can be used to allow a viewer of a live video feed of an event, such as a street performance, to switch views to a live feed captured from another angle or of higher quality, without searching for such a feed. In this example, these mechanisms can also be used to allow a viewer of a live video feed to be automatically presented with a newly created and streamed live video feed that is determined to depict the same event. As another example, these mechanisms can be used to automatically group video from various sources of a particular event, such as a storm, a natural disaster, a show, or any other suitable event, for presentation to viewers. As yet another example, these mechanisms can be used to automatically group videos depicting the same event, such that if a viewer watches one video of the event and would like to watch more, the viewer is not required to search for other videos, which can increase user engagement with videos.

Figure 1:
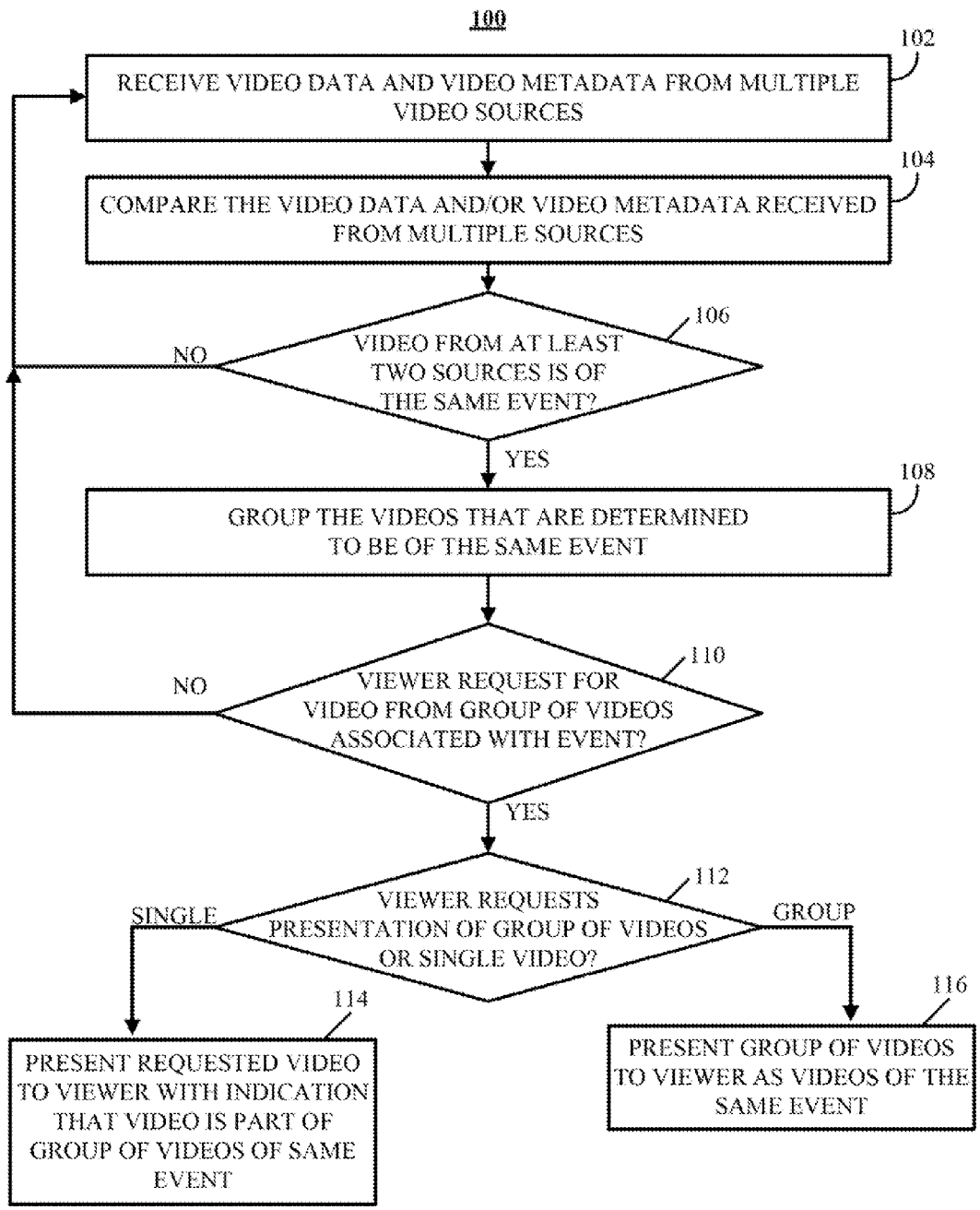
FIG. 1 shows an example of a process for aggregating and presenting multiple videos of an event in accordance with some embodiments of the disclosed subject matter.

Turning to FIG. 1, an example 100 of a process for aggregating and presenting multiple videos of an event is shown in accordance with some embodiments of the disclosed subject matter. As shown, an aggregation application can receive video data and video metadata from multiple video sources at 102. For example, the aggregation application can receive user-generated content from users of a video-sharing service, a video hosting service, or the like. In another example, the aggregation application can receive user-generated content from users that submit content to a particular entity, such as a media company (e.g., a news company, a network television company, etc.). In yet another example, in response to detecting a user preference to associate submitted video content with events, the aggregation application can automatically receive user-generated video content and corresponding video metadata while recording the video content.

In some embodiments, the video data can be a live stream of video data (e.g., video data that is being transmitted contemporaneously with the video being captured), recorded video data (e.g., video data that is not transmitted contemporaneously with the video being captured), or any suitable combination thereof. For example, first video data of a particular event can be a live video stream of the event, second video data can be recorded video data of the event, third video data can be a live video stream of the event that has since been recorded, etc. It should be noted that video data can be received from any suitable source of video data. For example, in some embodiments, video data can be received from a device having a camera (e.g., a smartphone, a mobile phone, a tablet computer, a wearable computer, a personal computer, etc.) that recorded the video data. As another example, video data can be received from a camera device (e.g., a camcorder, a camera operated by a news organization, a security camera, a traffic camera, etc.) that recorded the video data. As still another example, video data can be received from a computing device that may not have recorded the video data (e.g., a personal computer onto which the video data has been stored).

In some embodiments, video data can be in any suitable format and can include audio data, including, for example, and without limitation, any Moving Picture Experts Group (MPEG) standard, Audio Video Interleave (AVI) standard, a WebM standard, or any other suitable compression format. The audio and/or video data can be encoded in a file or a bit stream either together or separately.

In some embodiments, video metadata can include any suitable information about the video data, such as title information, description information, location information, direction information, timing information, camera information (e.g., brightness, gain level, ISO, volume level, model information, image sensor information, etc.), or any other suitable information. Metadata can be associated with the video data from any suitable source. For example, in some embodiments, a camera device that captured the video data can associate various metadata generated by the camera device with the video data. In a more particular example, this metadata can include: a time when the video data was captured; a location where the video data was captured (e.g., latitude and longitude, approximate latitude and longitude, an elevation or approximate elevation, a ZIP code, a neighborhood, a city, a town, a state, a country, etc.); and/or a direction that a lens and/or body of the camera device was directed when the image was captured (e.g., a compass heading, an angle with respect to gravity, etc.). In another example, the camera device that captured the video data and/or a computing device to which the video data was downloaded can associate the video data with various metadata input by a user (e.g., a title, a description, keywords, tags, etc.), or generated automatically. In a more particular example, an application executing on a mobile device that is capturing video data can prompt the user to input a tide and description of the video content being captured.

It should be noted that process 100 can be initiated using any suitable techniques. For example, the aggregation application can continuously compare videos to determine if they are videos depicting the same event, or can compare videos whenever a new video is received. As another example, the aggregation application can compare videos to determine if they are videos depicting the same event when a live streaming video is received. As yet another example, the aggregation application can compare videos to determine if the videos depict the same event in response to a viewer input (e.g., a viewer selecting an option that searches for videos depicting the same event).

At 104, the aggregation application can compare video data and/or metadata from various sources to determine whether the video data depicts the same event. It should be noted that the determination of whether video data from multiple sources (e.g., different camera devices, different users, etc.) depicts the same event can correspond to a likelihood that the videos depict the same event. For example, various metadata and/or video data can be compared and a score can be determined based on a degree of correspondence between the various data being compared. In a more particular example, a location where two videos were captured can be compared and the greater the distance between the locations, a lower score for the location can be assigned.

It should be noted that the aggregation application can use any suitable data as the basis to compare video data from different sources to determine whether the videos depict the same event. For example, if one video lacks a particular type of data, such as direction information, audio data, etc., the comparison can be made on the basis of a type(s) of information and/or data shared by the videos, such as location information, timing information, title information, etc.

In some embodiments, the aggregation application can compare video from multiple sources in any suitable manner. For example, video data and video metadata received from a particular source can be compared to video data and video metadata received from all other sources. As another example, the aggregation application can use an iterative process to successively reduce the number of videos that are compared at each stage of the process. In a more particular example, the aggregation application can determine whether the videos were captured during a similar period of time (e.g., during overlapping time periods, within a threshold number of minutes, etc.), as videos captured at differing time periods may be less likely to depict the same event. A further example is described below in connection with FIG. 2.

In some embodiments, the aggregation application can compare a candidate video (e.g., a video that includes video data and video metadata received at 102) to other videos (e.g., other video data and video metadata that was previously received) serially and/or in parallel. For example, the candidate video can be compared to other videos serially (e.g., one after another) to determine whether the candidate video and one of the other videos depicting the same event. In another example, the candidate video can be compared to other videos in parallel (e.g., concurrently) to determine whether the candidate video and one of the other videos depicting the same event. Additionally, the candidate video can be compared to other videos in parallel for comparisons that require a relatively lower amount of processing (e.g., comparing location, comparing direction, comparing time, etc.) and can be compared serially for comparisons that require a relatively larger amount of processing (e.g., extracting and comparing video data, extracting and comparing audio data, etc.).

At 106, the aggregation application can determine whether the video from at least two sources compared at 104 depict the same event. Any suitable techniques can be used to determine whether the video from at least two sources depict the same event. For example, if the timing information of the two videos overlaps, the location information from the two videos indicates that the two videos were captured close to one another, and the title and/or description information of the videos are similar, the aggregation application can determine that the videos depict the same event.

In some embodiments, the aggregation application can generate a similarity score for each type of metadata used as the basis for a comparison between videos and/or video metadata. For example, a similarity score can be generated based on timing information of two videos, such that a greater difference in timing information (e.g., a start time, an end time, a median time, etc.) between the two videos results in a lower similarity score being assigned for the two videos, and a smaller the difference in timing information between the two videos results in a higher similarity score being assigned for the two videos. As another example, a similarity score can be generated based on location information of two videos, such that a greater difference in location information (e.g., a start location, an ending location, an average location, an elevation, etc.) between the two videos results in a lower similarity score being assigned for the two videos, and a smaller the difference in timing information between the two videos results in a higher similarity score being assigned for the two videos. As yet another example, a similarity score can be generated based on title information of two videos (e.g., using any suitable techniques such as those described below in connection with FIG. 2), such that a greater degree of matching in the title information (e.g., the same words are used, at least one word is used in both titles, etc.) between the two videos results in a higher similarity score being assigned for the two videos, and a lesser degree of matching in the title information between the two videos results in a lower similarity score being assigned for the two videos.

In some embodiments, similarity scores that correspond to a particular parameter generated between one video and various other videos can be compared (e.g., ranked) and videos having the highest similarity scores can be considered more likely to be of the same event. In such an embodiment, videos depicting the same event can be determined by successively winnowing a list of videos based on different types of metadata or the like. For example, a time similarity score can be generated between a particular video and various other videos with somewhat similar timing information (e.g., timing information within one hour of the timing information of the particular video), and the top fifty results (or any other suitable amount) can be kept. Then, a location similarity score can be determined between the particular video and other videos with somewhat similar location (e.g., location information within one mile of the particular video), and the top twenty results (or any other suitable amount) can be kept. This can be performed for various parameters until any suitable number of videos is identified (e.g., a video most likely to depict the same event, the five videos most likely to depict the same event, etc.).

In some embodiments, similarity scores generated for various parameters can be combined (e.g., added, averaged, etc.) for each video, and videos can be ranked based on the combined similarity score. It should be noted that when similarity scores are combined, some similarity scores can be weighted higher than others (e.g., if a timing parameter or a location parameter is deemed more important, a similarity score for that parameter can be assigned a higher weight than a direction or orientation parameter).

Additionally, videos that have a similarity score below a threshold can be discarded as unlikely to depict the same event regardless of where the video ranks in a list of similarity scores.

If the aggregation application determines that the videos from at least two sources depict the same event ("YES" at 106), process 100 can proceed to 108. Otherwise, if the aggregation application determines that the videos from at least two sources are not likely to depict the same event ("NO" at 106), process 100 can return to 102 and receive video data and video metadata from another source.

At 108, the aggregation application can group videos that are determined to depict the same event. Videos that the aggregation application determines to depict the same event can be associated with one another using any suitable techniques. For example, videos received at 102 can be maintained in a database of videos and videos that are determined to likely depict the same event can be associated with the event and/or with one another and with any other videos that also depict the same event. In a more particular example, if there are seven videos of the same event, each of the videos can be associated with each of the other videos such that each video has six associated videos that are considered to depict the same event. Additionally or alternatively, if there are seven videos depict the same event, each of the videos can be associated with the event and vice versa, and when one of the videos is requested, the other videos can be retrieved based on the relationship between each video and the event. As another example, videos that are determined to depict the same event and/or copies of such videos can be stored in association with one another in a single container (e.g., in a folder, table, database, etc.) that corresponds to the event.

In some embodiments, when a video is added to a group of videos depicting the same event, the video can be associated with all videos of the event, or alternatively, can be associated only with those videos which are determined to depict a particular event based on comparing information from the videos. For example, if a first video is determined to depict the same event as a second video, and the second video is determined to depict the same event as a third video, the first video can be associated with the third video on the basis of both the first and third video depicting the same event as the second video. Alternatively, the first video and third video may only be associated if the videos are independently determined to depict the same event, apart from the videos being determined to depict the same event as the second video.

Figure 2:
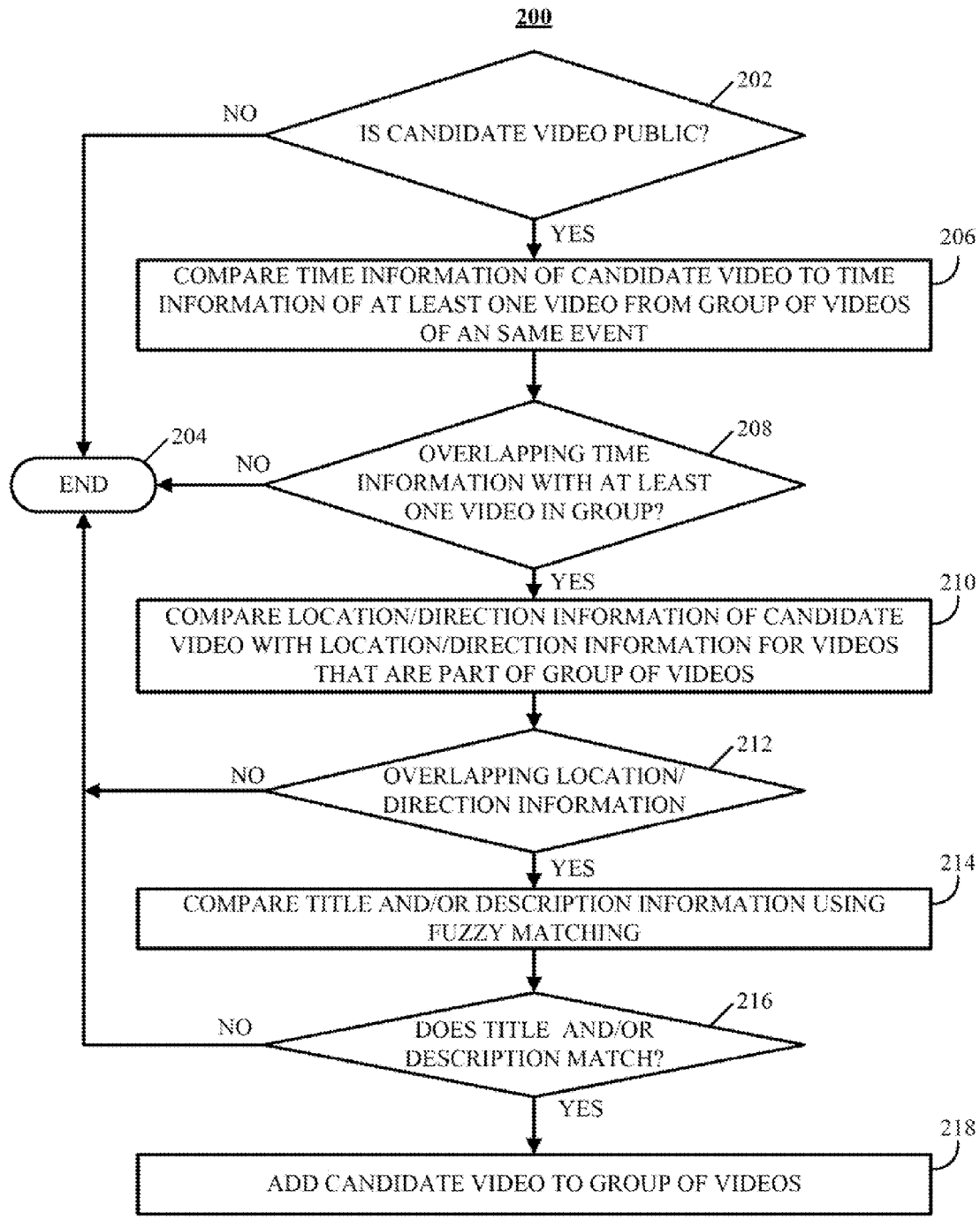
FIG. 2 shows an example of a process for determining whether a candidate video depicts the same event as a group of videos of the same event in accordance with some embodiments of the disclosed subject matter.

FIG. 2 shows an example 200 of a process for comparing information from a candidate video to information from a group of videos that depict an event to determine whether to associate the candidate video with the event in accordance with some embodiments of the disclosed subject matter. It should be noted that the group of videos can include a single video or a plurality of videos that have previously been determined to depict the same event. At 202, the aggregation application can determine whether the video is a public video or a private video. In some embodiments, a public video can include any video that is made available to the public by a user that provided the video (e.g., a video uploaded and/or streamed by a user) or any video that is otherwise generally made available to the public (e.g., video made available to the public by a public entity such as a municipality, video provided by a content producer such as a news program, etc.). Additionally, private videos can include any videos that are made available to only certain viewers. This can include copyright restrictions, viewing restrictions based on privacy settings, or any other type of restriction.

If the aggregation application determines that the candidate video is not a public video ("NO" at 202), process 200 can end at 204 and the candidate video can be inhibited from being associated with an event and/or with other videos. Otherwise, if the candidate video is a public video ("YES" at 202), process 200 can proceed to 206.

At 206, the aggregation application can compare timing information of the candidate video to timing information of at least one video from a group of videos of an event. In some embodiments, if the videos being compared are live video streams, the timing information can include the time when the videos are received at a server that is streaming the video to viewers as a live video stream and/or a time associated with the video by a device that recorded the video (e.g., as a time stamp in the video metadata). Alternatively, if the video is a pre-recorded video (e.g., not a live video stream), the timing information can include a time associated with the video by a device that recorded the video (e.g., as a time stamp in the video metadata). Additionally, a time when a live video stream was received at a server can be compared to a time associated with a pre-recorded video.

At 208, the aggregation application can determine whether the timing information of the candidate video overlaps with timing information of at least one of the videos in the group of videos depicting the same event. For example, the aggregation application can determine that the timing information overlaps if one of the videos of the group of videos depicting the same event is a live video stream of the event that is currently being received, and the candidate video is a live video stream that is also currently being received. As another example, the aggregation application can determine that the timing information overlaps if one of the videos of the group of videos depicting the same event is a pre-recorded video that was captured during a first time period (e.g., as indicated by a time stamp of the video data), and the candidate video was captured during a second time period that overlaps the first time period. As yet another example, the aggregation application can determine that the timing information overlaps if one of the videos of the group of videos of the same event is a live video stream of the event that is currently being received, and the candidate video is a pre-recorded video that was captured during a time period that includes at least a portion of the time from when the live video stream was initially received to the time when the live video stream is currently being received.

In some embodiments, the aggregation application can add a margin to timing information when determining whether the timing of two videos overlaps. For example, a margin can be included in timing information for a live video stream or a pre-recorded video such that candidate videos that have timing information that is within a designated time window (e.g., one minute, five minutes, thirty minutes, two hours, etc.) to the timing information of a video of an event can be determined to have timing information that overlaps the timing information of the event. Additionally, the size of the margin can be varied depending on the type of event that is included in the video, which can be determined, for example, based on the title information, description information, location information combined with supplementary information (e.g., news reports, social media, etc.), or any other suitable information. For example, if the event is a natural disaster, such as a hurricane or a blizzard the margin can be made larger, as this type of event typically lasts an extended period of time. As another example, if the event is a street performance the margin can be made smaller, as these types of events typically last a shorter amount of time.

If the aggregation application determines that the timing information does not overlap ("NO" at 208), process 200 can end at 204. Otherwise, if the aggregation application determines that the timing information of the candidate video overlaps the timing information of at least one of the videos of an event, process 200 can proceed to 210.

At 210, the aggregation application can compare location and/or direction information of the candidate video to location and/or direction information of videos that are part of the group of videos depicting the same event. In some embodiments, the location information can include coordinates such as coordinates derived using the Global Positioning System (GPS), and/or approximate coordinates such as coordinates derived using multilateration techniques (e.g., triangulation of radio signals from a known radio source, such as a wireless base station), or the like. In some embodiments, direction information can include a direction (e.g., a compass heading) of the camera device (and/or a lens of the camera device) when the video data was captured. The direction information can be derived using any suitable techniques. For example, direction information can be derived from an electronic compass (e.g., a fiber optic gyrocompass or a magnetometer based compass) that is included in (or coupled to) the camera device that captured the image. As another example, direction information can be input by a user. As another example, direction information can be based on a known mounting direction of a camera device and, where appropriate, panning information of the camera device (e.g., in the case of a camera installed at a known fixed location).

In some embodiments, location and/or direction information of the candidate video can be compared to all videos that are included in the group of videos depicting the same event. For example, if the candidate video was identified as overlapping in time with a particular video that is associated with a group of videos depicting the same event at 208, location information of the candidate video can be compared with all videos in the group (e.g., not only a video that was identified as overlapping in time at 208). Alternatively, location information of the candidate video can be compared to only a video(s) that have timing information that overlaps with the timing information of the candidate video. For example, a single event may take place in different locations (e.g., an event such as a parade or a race may take place over a relatively long distance). In some embodiments, a candidate video can be associated with the group of videos depicting the same event at a particular location (or locations, if the candidate video was captured at different locations) and/or with a particular period of time with respect to the event.

At 212, the aggregation application can determine whether there is overlap between the location and/or direction information of the candidate video and the location and/or direction information of any of the group of videos depicting the same event. For example, the aggregation application can determine whether the location information associated with the candidate video indicates that the location where the candidate video was captured is close to the location of one or more videos in the group of videos depicting the same event. As another example, the aggregation application can determine whether the area captured in the candidate video overlaps the area captured in one or more videos in the group of videos. Using the location information and the direction information, the aggregation application can determine if a field of view captured in the candidate video is likely to overlap with a field of view captured in one or more of the videos in the group of videos depicting the same event.

In some embodiments, the aggregation application can add a margin to location information when determining whether the location and/or direction of two videos overlap. For example, a margin can be added to location and/or direction information for a candidate video and/or a video associated with a group of videos depicting the same event such that candidate videos that have location and/or direction information that is close (e.g., twenty five feet, fifty feet, one hundred feet, a half mile, etc.) to the location and/or direction information of a video of an event can be determined to have location and/or direction information that overlaps the location and/or direction information of the event. Additionally, the size of the margin can be varied depending on the type of event that is included in the video, which can be determined, for example, based on the title information, description information, location information combined with supplementary information (e.g., news reports, social media, etc.), or any other suitable information. For example, if the event is a natural disaster, such as a hurricane or an earthquake the margin can be made larger, as this type of event typically takes place over a larger area. As another example, if the event is a street performance the margin can be made smaller, as these types of events typically take place over a smaller area.

In some embodiments, the size of the margin can be based on the density of videos from a particular location at a particular time. For example, if there are multiple videos captured at a similar location during a particular time, if the density of the locations of these captured videos is high (e.g., the videos appear to be concentrated in a particular location), the margin can be made relatively smaller, as an event that is being captured is likely to be a more local event. If the density of the locations of the captured videos is low (e.g., the videos do not appear to be concentrated in a particular location), the margin can be made relatively larger, as an event that is being captured is likely to be a less local event. As yet another example, the location and/or direction information of different videos can be used to determine a likely center of an event (e.g., where lines representing a direction of various videos intersect). If the center is determined to be smaller, the margin can be made smaller as the event is likely to be a local event, and if the center is determined to be larger, the margin can be made larger as the event is less likely to be a local event.

Figure 3:
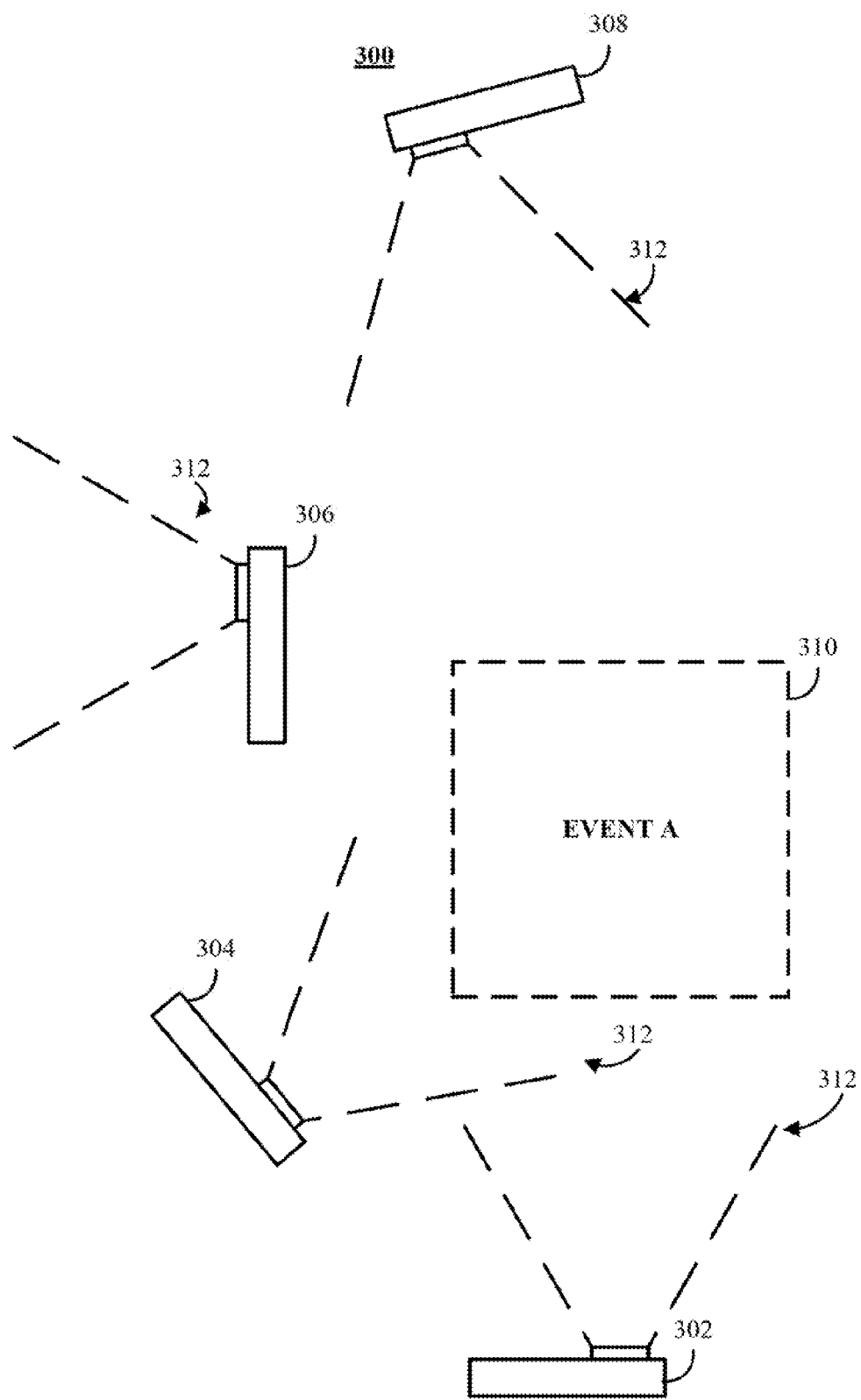
FIG. 3 shows an example of camera devices capturing video of an event in accordance with some embodiments of the disclosed subject matter.

FIG. 3 shows an example 300 of camera devices 302-308 that are used to capture video near an event 310 during a certain period of time. In example 300, video devices 302-308 are capturing video at the same point in time and, therefore, the aggregation application determines at 208 that there is overlap in the timing information of the videos. In cases where the aggregation application uses location information but not direction information, the aggregation application can consider there to be overlap in the location information of all camera devices 302-308. In cases where the aggregation application also uses direction information, the aggregation application can determine that a field of view 312 of camera devices 302, 304 and 308 is likely to overlap based on a direction and location of the camera devices. However, the aggregation application can also determine that although the location of camera device 306 is relatively close to camera devices 302, 304 and 308, field of view 312 of camera device 306 is unlikely to overlap with any of the fields of view 312 of camera devices 302, 304 and 308 because camera device 306 is facing away from event 310, rather than toward event 310.

Referring back to FIG. 2, if the aggregation application determines that the location and/or direction information of the candidate video and at least one of the group of videos depicting the same event does not overlap ("NO" at 212), process 200 can end at 204. Otherwise, if the aggregation application determines that the location and/or direction information ("YES" at 212) does overlap, process 200 can proceed to 214.

At 214, the aggregation application can compare title and/or description information of the candidate video to title and/or description information of videos in the group of videos depicting the same event. Any suitable techniques can be used to compare the title and/or description information between videos. For example, in some embodiments, fuzzy matching techniques can be used when comparing title and/or description information. These fuzzy matching techniques can include approximate string matching techniques that can be used to determine whether two strings of characters are similar, such as through insertion of characters, deletion of characters, substitution of characters, transposition of characters, etc. For example, a Levenshtein distance, a Damrau-Levenshtein distance, a Mahalanobis distance, etc., can be calculated between strings of characters in the title and/or description. Additionally, these fuzzy matching techniques can further include matching of synonyms or words that are often used in connection with one another, such as fire and explosion, performance and dance, etc. It should be noted that any suitable techniques for determining whether strings of characters are similar can be used to determine a similarity between the title and/or description information of videos.

As another example, keywords and/or tags in a title and/or description of the candidate video can be compared to keywords and/or tags used in the title and/or description of one or more of the videos in the group of videos depicting the same event. For example, if a user of the candidate video uses keywords and/or tags in the description of the candidate video, these can be compared to keywords and/or tags used in the description of videos in the group of videos depicting the same event.

At 216, the aggregation application can determine whether the title and/or description information of the candidate video matches the title and/or description information of one of the videos in the group of videos depicting the same event. For example, if at least one word of the title information of the candidate video matches at least one word of the title information of at least one video in the group of videos depicting the same event, the aggregation application can determine that the title information matches. It should be noted that when determining whether there are any words that match, the aggregation application can ignore certain common parts of speech (e.g., words such as "the" or "a," pronouns, etc.) and can utilize approximate string matching techniques, or the like, as described above. Further, the aggregation application can determine whether any words in the title of the candidate video is a synonym for a word in the title of at least one of the videos in the group of videos depicting the same event. As another example, if a certain proportion of words used in the description information of the candidate video match words used in the description of videos in the group of videos depicting the same event, the aggregation application can determine that the description information of the candidate video matches the description information of the group of videos depicting the same event.

Additionally or alternatively, if the aggregation application determines that the candidate video has overlapping timing information with at least one video in a group of videos depicting the same event, and that the candidate video has overlapping location information with at least one video in the group of videos depicting the same event, a user that is supplying the video can be queried to determine whether the candidate video depicts the same event as the group of videos. For example, if there is overlap of timing and location information between a candidate video and a video of an event, the user can be queried based on the title of the video of the event to determine if the candidate video depicts the same event. In a more particular example, if the video of an event has title information "Fire at 53rd Street and Broadway" the aggregation application can query the user to determine whether the candidate video is of "Fire at 53rd Street and Broadway." If the user indicates that the candidate video depicts the same event (e.g., by responding yes to the question "Is your video of 'Fire at 53rd Street and Broadway?'"), the aggregation application can use this information to determine that there is a match between the title and/or description information of the candidate video and at least one video of the event.

If the aggregation application determines that a match between the title and/or description information of the candidate video and at least one video of the group of videos has not occurred ("NO" at 216), process 200 can end at 204. Otherwise, if the aggregation application determines that there is a match between title and/or description information of the candidate video and at least one video of the group of videos ("YES" at 216), process 200 can move to 218.

As described above, in comparing particular video metadata and other information between videos (e.g., timing information, location information, title information, description information, etc.), the aggregation application can generate a similarity score for each comparison and can generate an overall similarity score between videos that accounts for each type of video metadata. For example, a high similarity score when comparing title information between videos can receive a higher weight in the overall similarity score than a low similarity score when comparing orientation information between videos. In another example, the aggregation application can determine that videos are not likely to correspond to the same event in response to the overall similarity score being less than a threshold value. It should be noted that, in some embodiments, the aggregation application can provide the user with an opportunity to set particular weights or importance indicators for particular pieces of video metadata.

At 218, the aggregation application can add the candidate video to the group of videos by, for example, associating the candidate video with the event common to the group of videos and/or by associating the candidate video with the other videos of the group of videos.

In some embodiments, the aggregation application can repeat process 200 for various videos to determine which videos are videos depicting the same event, and which videos are not videos of that event. For example, it may be that two videos are determined to be part of a first group of videos of a first event, and a third and fourth video are determined to be part of a second group of videos of a second event. In such an example, a fifth video can be received that is determined to be part of the first group of videos and a part of the second group of videos. This can be interpreted by the aggregation application as evidence that the first event and the second event may depict the same event, whereupon the aggregation application can associate these five videos into a group of videos of the first event and the second event, or can merge the first and second events. This can be the result of the first and second videos being captured at a first location and the third and fourth videos being captured depict the same event at a second location that is relatively far from the first location. The fifth video in this case can be a video that was captured at a third location that is relatively close to both the first and second location, as well as sharing other characteristics in common with at least one of the videos from the first group and at least one of the videos of the second group. Additionally, this can be the result of the first and second videos being captured during a first period of time, and the third and fourth videos being captured depicting the same event during a second period of time that does not overlap with the first period of time. The fifth video in this case can be a video that was captured during a third period of time that overlaps both the first and second periods of time.

It should be noted that, although timing information, location/direction information and title/description information are described in connection with FIG. 2 as being used to determine whether videos are that depict the same event, any suitable information can be used to determine whether videos depicting the same event. For example, audio data from videos can be analyzed (e.g., using audio fingerprinting techniques, audio fuzzy matching techniques, or the like) to determine whether two or more videos contain similar portions of audio data such as a distinctive sound (e.g., an audio event that is similar) or similar background audio data (e.g., traffic noise, crowd noise, etc.). The presence of similar audio data, especially if the similar audio data is included at similar points in time can indicate that the videos are more likely to depict the same event. As another example, the brightness of the video can be analyzed to determine if the videos are likely to depict the same event (e.g., average brightness of the video data can be compared using any suitable techniques) and if the brightness is similar, this can indicate that the videos are more likely to depict the same event. As yet another example, image matching techniques (e.g., facial recognition, pattern recognition, general image recognition, or the like) can be used to determine whether information in the video data of different videos depict the same subject, the same background, etc.

In some embodiments, after at least two videos have been determined to depict the same event, the aggregation application can determine whether timing information of the videos indicates that it is likely that the event is ongoing (e.g., if one of the videos is an ongoing live video stream of the event, if the videos were captured recently such as in the last five minutes, etc.). If the aggregation application determines that the event is likely to be ongoing, a notification can be sent to camera devices that are configured to accept such notifications (e.g., a user can choose to set their camera device to receive push type notifications from the aggregation application), that are located in the vicinity of the event, and that are currently recording video. Such a notification can query the user of the camera device as to whether they are recording the same event that was depicted in the at least two videos (e.g., by identifying a title or description of the event from one of the videos) and in response to an affirmative answer, query the user to determine whether the user would like to begin a live video stream of the event and/or whether the user would like to upload the video when the user is done recording the event.

In some embodiments, the aggregation application can generate event metadata for a particular event after a predetermined number of videos have been determined to depict the particular event. Such event metadata can include information that describes the event such as location, timing information, title and/or description information, etc. This information about the event can be generated based on video metadata of one or more of the videos that have been determined to depict the event. The event metadata can be generated from the video metadata using any suitable techniques. For example, the event metadata such as location information or timing information can be generated as an average (e.g., median, mean, mode, etc.) of the location information from the various videos. As another example, location information for the video data can include all of the location information of videos that have been determined to depict the event. Such location information can be included by defining a shape that includes all of the location information such as a circle that includes all of the location information. As yet another example, title information for the event can be generated using summary techniques, by determining most used words, etc.

Referring back to FIG. 1, at 110, the aggregation application can determine whether a viewer has requested a video from a group of videos associated with the same event. For example, as described above, the videos can be associated with each other, and/or the videos can be associated with a particular event. In some embodiments, when a viewer requests a video, the aggregation application can determine whether the video is associated with other videos as part of a group of videos depicting the same event or whether the video is associated with a particular event. If a viewer has not requested a video from a group of videos associated with an event (e.g., has not requested a video at all, has requested a video that is not associated with a group of videos, etc.) ("NO" at 110), process 100 can return to 102 and continue to receive video. Alternatively, if no video data is being received, process 100 can return to 110 and determine whether a viewer has requested a video that is part of a group of videos. Otherwise, if a viewer has requested a video that is associated with a group of videos depicting the same event ("YES" at 110), process 100 can proceed to 112.

At 112, the aggregation application can determine whether a viewer requested presentation of the group of videos or a single video. Any suitable techniques can be used to determine whether a viewer requests a single video or the group of videos for presentation. For example, if the viewer requests a single video from a list of search results (e.g., the viewer was searching for videos having certain characteristics, or the like) or from a link to a single video (e.g., as a recommended video, as a URL of a particular video, etc.), the aggregation application can inform the viewer that the requested video is one of a group of videos depicting the same event, and the user can be queried to determine whether the user wishes to be presented with a single video or with the group of videos. As another example, if the viewer requests the group of videos (e.g., using a link to the group of videos), the aggregation application can determine that the user has requested the group of videos and not a single video from the group.

If the aggregation application determines that the user has requested a single video (e.g., the user selected an option to be presented with a single video, the user is using a device that does not support presentation of a group of videos, the user is using an application that does not support presentation of a group of videos, etc.) ("SINGLE" at 112), process 100 can proceed to 114 where the single video can be presented to the user. In some embodiments, the user can also be presented with an indication that the single video presented to the user is part of a group of videos depicting the same event (e.g., by presenting an option in a video window in which the video is being presented as an icon, a popup, or the like; by presenting the viewer with a message; by presenting the viewer with a link to the group of videos depicting the same event; by presenting the viewer with links to other videos depicting the same event as recommended videos when the single video has been presented, etc.). Such an indication can be selected by a viewer, in some embodiments, to access other videos corresponding to the same event.

Figure 4:
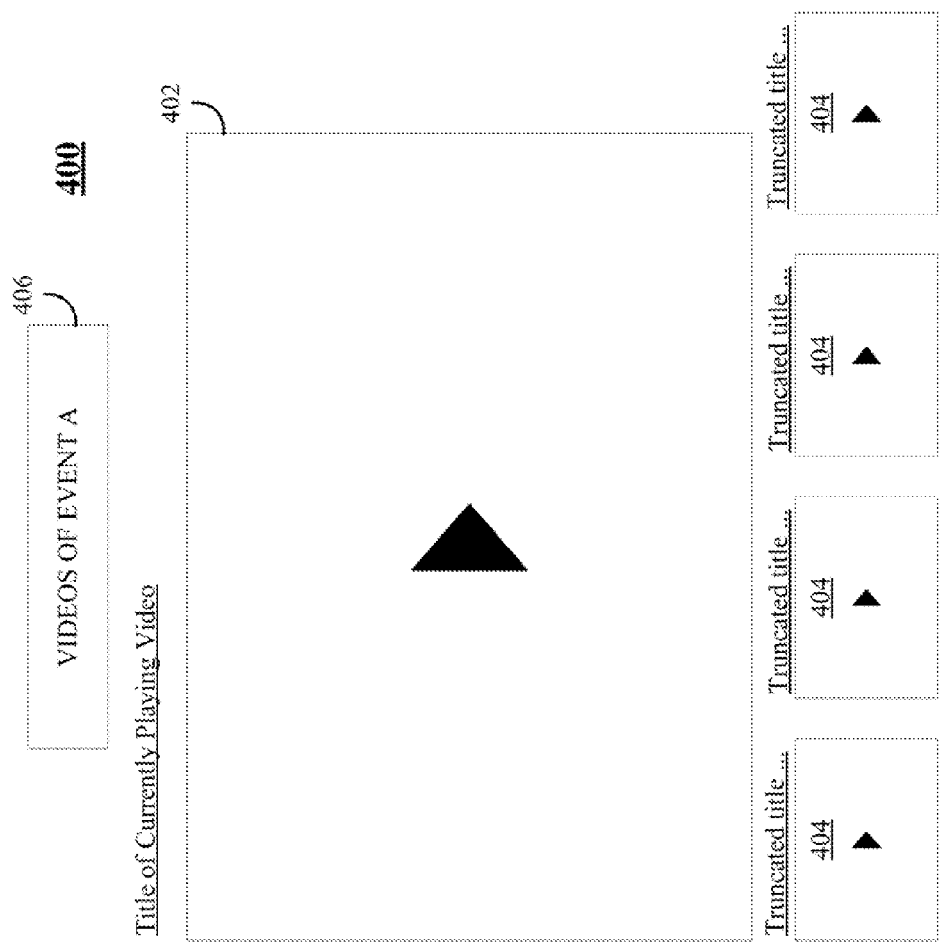
FIG. 4 shows an example of a user interface for presenting multiple videos to a viewer in accordance with some embodiments of the disclosed subject matter.

If the aggregation application determines that the user has requested the group of videos for presentation ("GROUP" at 112), process 100 can proceed to 116. At 116, the group of videos can be presented to the viewer. FIG. 4 shows an example 400 of a user interface for presenting the group of videos to a viewer. User interface 400 can be presented to the user using any suitable techniques. For example, user interface 400 can be presented as part of a web page for viewing videos, as part of an application for viewing videos, as part of a computer program for viewing videos, etc.

In some embodiments, when the user has requested either a single video or a group of videos, the aggregation application can continue to receive video data and video metadata from other sources and can continue to determine whether additional videos depict the same event. In response to determining that a video from yet another source depicts the same event (e.g., another live stream of an event), the aggregation application can present the user with an indication that another video is available—e.g., by presenting an option in a video window in which the video is being presented, by presenting the user with a message, by presenting the user with a link to the additional video depicting the event, etc. In some embodiments, the aggregation application can automatically present the additional video that depicts the same event to the user—e.g., in the same video window, where the size of the currently viewed video is reduced to half of the video window and the additional video occupies the remaining half of the video window.

User interface 400 can include a primary video 402 and secondary videos 404 that have been determined to depict the same event. User interface 400 can also include an event title 406 identifying the event that the group of videos is associated with. In some embodiments, primary video 402 can be a video that was a requested by the viewer at 110. Additionally or alternatively, primary video 402 can be a first video received of the event (e.g., a video with an oldest time stamp or a live video stream that was received first), a longest video (e.g., a video that covers the most time of the event), a highest quality video of the event (e.g., a video having quality metrics such as resolution, focus, brightness, absence of camera shake, etc., that are rated higher than quality metrics of the other videos), or any other techniques for identifying a primary video to present to a viewer.

In some embodiments, primary video 402 can be presented to a viewer (e.g., a user selects to play the video, the video is started automatically, etc.) and secondary videos 404 can be presented as a still thumbnail while the primary video if being presented. Alternatively, secondary videos 404 can be presented concurrently while primary video 402 is being presented and the timing of the videos can be matched such that the secondary videos are presenting the same moment in time as the primary video. For example, when the viewer is currently watching primary video 402 and the aggregation application determines that another device is live streaming a secondary video 404, the secondary video 404 can be presented concurrently while primary video 402 is being presented. In this example, the secondary video 404 can be presented to the viewer in response to the viewer watching primary video 402 and once the aggregation application determines that the videos depict the same event (e.g., once a match is determined).

In some embodiments, a viewer can select a secondary video 404 to be presented as primary video 402. This can cause the video being presented as primary video 402 to be presented as a secondary video 404 and for the particular secondary video 404 selected by the viewer to be presented as the primary video.

In some embodiments, there may be a maximum number of videos that can be presented using user interface 400 and additional videos associated with the event can be presented, for example, on an additional page(s) accessible from user interface 400. A determination of an order in which to present videos to a viewer can be based on any suitable ranking techniques. For example, in some embodiments, videos can be ranked based on quality metrics (e.g., resolution, focus, presence of camera shake, etc.) or based on timing information (e.g., oldest videos of an event can be presented first), or any other ranking techniques.

In some embodiments, viewers can indicate that a particular video that is included in the group of videos does not depict the same event (e.g., has been erroneously included in the group, despite not depicting the same event). In such embodiments, if a certain number of viewers indicate that a video has been incorrectly included (e.g., five viewers, ten viewers, one percent of viewers of all the videos in the group, etc.) that particular video can be disassociated with the group. Alternatively, a video that viewers indicate is not part of the group can be flagged for review by an administrator and/or a verification application. For example, a video that has been flagged for review can be analyzed to determine if the video data is similar to video data in the other videos by a human administrator and/or a review application that uses image recognition techniques or the like.

It should be noted that although user interface 400 shows presentation of one primary video and several secondary videos, any suitable number of primary videos and secondary videos can be presented to the viewer.

Figure 5:
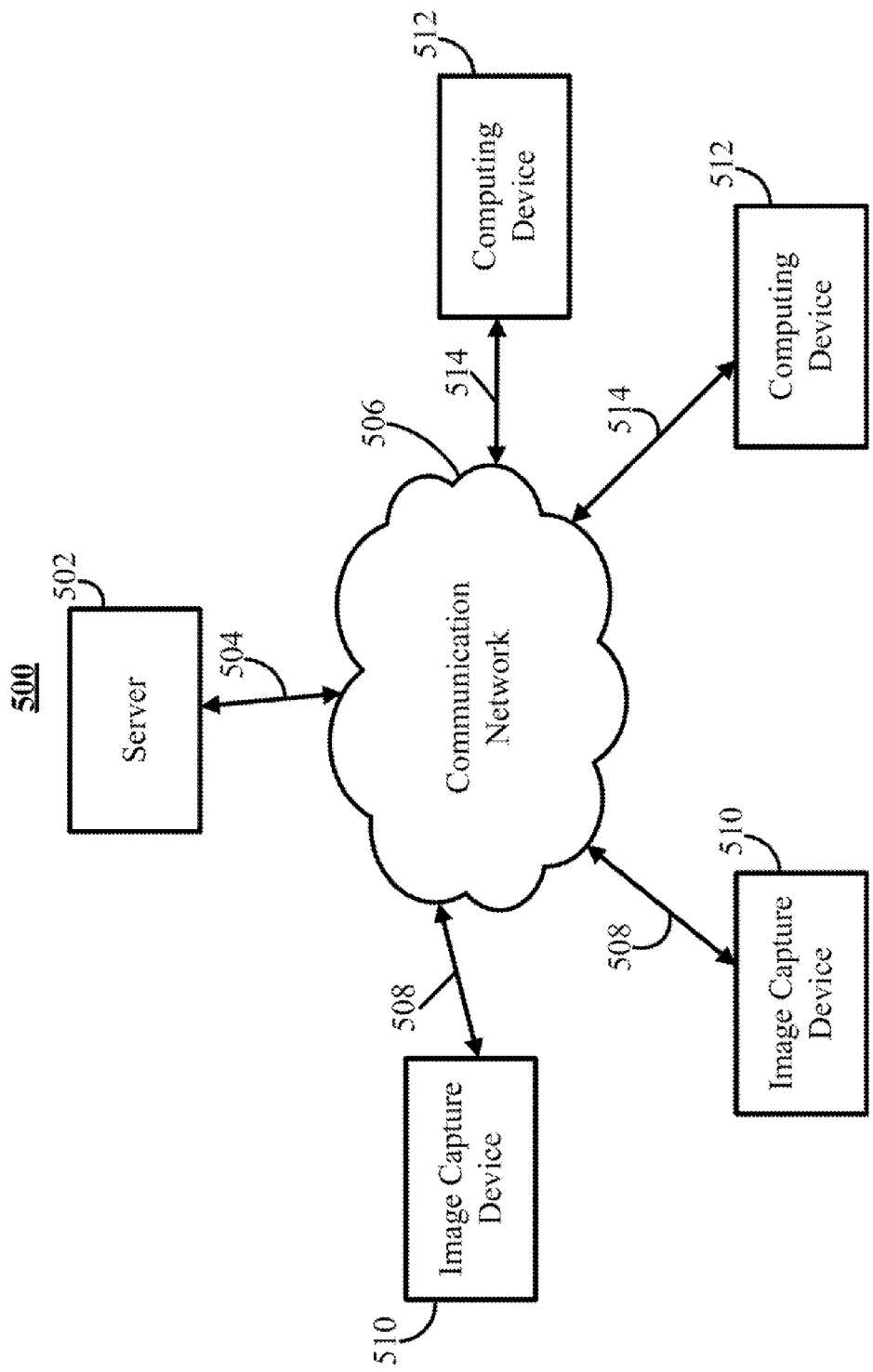
FIG. 5 shows a schematic diagram of an illustrative system suitable for implementation of the mechanisms described herein for aggregating and presenting multiple videos in accordance with some embodiments of the disclosed subject matter.

FIG. 5 shows an example 500 of a generalized schematic diagram of a system on which the mechanisms for presenting annotations across multiple videos as described herein can be implemented in accordance with some embodiments. As illustrated, system 500 can include one or more image capture devices 510. Image capture devices 510 can be local to each other or remote from each other. Image capture devices 510 can be connected by one or more communications links 508 to a communications network 506 that can be linked via a communications link 504 to server 502 and/or computing devices 512. System 500 can further include one or more computing devices 512. Computing devices 512 can be local to each other or remote from each other. Computing devices 512 can be connected by one or more communications links 514 to communications network 506 that can be linked via communications link 504 to server 502.

System 500 can include one or more servers 502. Server 502 can be any suitable server for providing access to the mechanisms described herein for aggregating and presenting multiple videos of an event, such as a processor, a computer, a data processing device, or any suitable combination of such devices. For example, the mechanisms for aggregating and presenting multiple videos of an event can be distributed into multiple backend components and multiple frontend components and/or interfaces. In a more particular example, backend components, such as data collection, data distribution and video aggregating can be performed on one or more servers 502. In another particular example, frontend components, such as video capture, a user interface, data entry, video presentation, etc., can be performed on one or more image capture devices 510 and/or one or more computing devices 512.

In some embodiments, each of the image capture devices 502, computing devices 512 and server 502 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, image capture device 510 can be implemented as a smartphone having a camera, a tablet computer having a camera, a wearable computer having a camera, a camera device that interfaces with a smartphone (e.g., a camera dongle for a smartphone), a digital camera (e.g., a point and shoot camera, a DSLR camera, a digital camcorder, etc.), an analog camcorder, any other image capture device for capturing video, or any suitable combination thereof. As another example, computing device 512 can be implemented as a personal computer, a laptop computer, a smartphone, a tablet computer, a gaming device, a digital media receiver, a set-top box, a smart television, a server, etc.

Communications network 506 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 504, 508 and 514 can be any communications links suitable for communicating data among image capture devices 510, computing devices 512, and server 502, such as network links, dial-up links, wireless links, hard-wired links, any other suitable communications links, or any suitable combination of such links. Image capture devices 510 can capture video of an event that can be uploaded to server 502 (either by image capture device 510 and/or computing device 512) and be associated with other videos depicting the same event by the aggregation application. Image capture device 510 can also be used to present videos from server 502 to a viewer (e.g., using an application for rendering videos). Computing devices 512 can be used to upload video captured by an image capture device 510 to server 502 running the aggregation application and/or present videos from server 502 to a viewer (e.g., using an application for rendering videos). Image capture devices 510, computing devices 512, and server 502 can be located at any suitable location.

Figure 6:
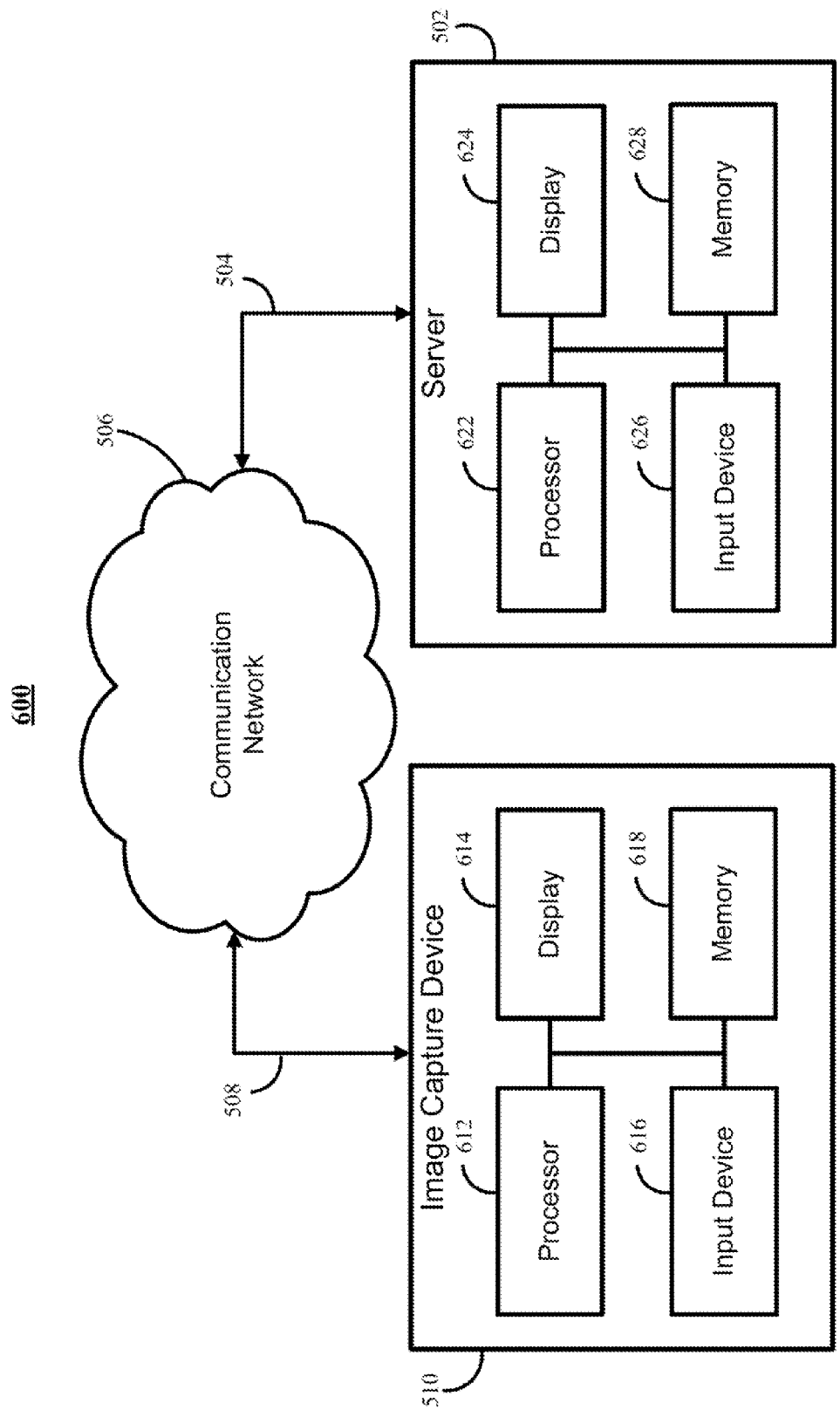
FIG. 6 shows a detailed example of a server and one of the image capture devices of FIG. 5 that can be used in accordance with some embodiments of the disclosed subject matter.

FIG. 6 illustrates an example 600 of hardware that can be used to implement server 502 and one of image capture devices 510 depicted in FIG. 5 in accordance with some embodiments of the disclosed subject matter. Referring to FIG. 6, image capture device 510 can include a hardware processor 612, a display 614, an input device 616, and memory 618, which can be interconnected. In some embodiments, memory 618 can include a storage device (such as a non-transitive computer-readable medium) for storing a computer program for controlling hardware processor 612.

Hardware processor 612 can use the computer program to present on display 614 content and/or an interface that allows a user to, among other things, capture video, enter title and/or description information, cause a video to be uploaded to server 502, interact with the mechanisms described herein for aggregating and presenting multiple videos of an event being executed by a device, such as server 502, and to send and receive data through communications link 508. It should also be noted that data received through communications link 508 or any other communications links can be received from any suitable source. In some embodiments, hardware processor 612 can send and receive data through communications link 508 or any other communication links using, for example, a transmitter, receiver, transmitter/receiver, transceiver, or any other suitable communication device. Input device 616 can be a lens, an image sensor, a computer keyboard, a computer mouse, a microphone, a touchpad, a voice recognition circuit, a touchscreen, and/or any other suitable input device.

Server 502 can include a hardware processor 622, a display 624, an input device 626, and memory 628, which can be interconnected. In some embodiments, memory 628 can include a storage device for storing data received through communications link 504 or through other links. The storage device can further include a server program for controlling hardware processor 622.

Hardware processor 622 can use the server program to communicate with image capture devices 510 and computing devices 512, as well as provide access to and/or copies of the aggregation application. It should also be noted that data received through communications link 504 or any other communications links can be received from any suitable source. In some embodiments, hardware processor 622 can send and receive data through communications link 504 or any other communication links using, for example, a transmitter, receiver, transmitter/receiver, transceiver, or any other suitable communication device. In some embodiments, hardware processor 622 can receive commands and/or values transmitted by one or more users. Input device 626 can be a computer keyboard, a computer mouse, a touchpad, a voice recognition circuit, a touchscreen, a lens, an image sensor, and/or any other suitable input device.

In some embodiments, server 502 can be implemented in one server or can be distributed as any suitable number of servers. For example, multiple servers 502 can be implemented in various locations to increase reliability and/or increase the speed at which the server can communicate with client devices 502. As another example, multiple servers 502 can be implemented for performing various tasks, such as one server (or set of servers) can receive videos (e.g., video data and video metadata), another server (or set of servers) can execute the aggregation application for determining whether received videos depicting the same event, and yet another server can present videos to viewers in response to a request to present a video.

It should be noted that computing device 512 can be implemented similarly to image capture device 510 and/or server 502, and can include a hardware processor, a display, an input device, and memory.

In one particular embodiment, the aggregation application can include server-side software, server-side hardware, client-side software, client-side hardware, or any suitable combination thereof. For example, the aggregation application can encompass a computer program written in a programming language recognizable by server 502 executing the aggregation application (e.g., a program written in a programming language, such as, Java, C, Objective-C, C++, C#, Javascript, Visual Basic, ColdFusion, or any other suitable approaches).

Accordingly, methods, systems, and media for aggregating and presenting multiple videos of an event are provided.

In some embodiments, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1 and 2 can be executed or performed in any order or sequence not limited to the order and sequence shown and described in the figures. Also, some of the above steps of the processes of FIGS. 1 and 2 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for identifying related video content, the method comprising:
   receiving, using a hardware processor, a first video and first video metadata that describes the first video submitted to a video hosting service over the Internet from a first camera device;
   receiving a second video and second video metadata that describes the second video submitted to the video hosting service over the Internet from a second camera device;
   comparing the first video metadata and the second video metadata;
   determining whether the first video and the second video are associated with an event based on the comparison, wherein the event is associated with timing information and location information;
   in response to determining that the first video and the second video are associated with the event, grouping the first video and second video into a plurality of videos associated with the event;
   receiving a request over the Internet from a first remote computing device to present at least the first video;
   causing the first remote computing device to present the first video in response to the request to present at least the first video;
   causing the first remote computing device to present, during presenting of the first video, image data of one or more videos of the plurality of videos, including the second video, associated with the event other than the first video;
   subsequent to causing the first remote computing device to present the first video, receiving a third video and third video metadata that describes the third video submitted to the video hosting service over the Internet from a third camera device;
   comparing the third video metadata, the first video metadata and the second video metadata;
   determining that the third video is associated with the event based on the comparison;
   in response to determining that the third video is associated with the event, grouping the third video into the plurality of videos associated with the event;
   receiving a request over the Internet from a second remote computing device to present at least the third video;
   causing the second remote computing device to present the third video in response to the request to present at least the third video; and
   causing the second remote computing device to present, during presenting of the third video, image data of one or more videos of the plurality of videos, including the first video and the second video, associated with the event other than the third video.

2. The method of claim 1, wherein comparing the first video metadata and the second video metadata further comprises comparing location information and timing information associated with the first video and the second video.

3. The method of claim 2, wherein determining that the first video and the second video are associated with the event further comprises:

determining a first similarity score between the timing information of the first video and the timing information of the second video; and determining a second similarity score between the location information of the first video and the location information of the second video.

4. The method of claim 2, wherein the location information includes coordinates and a compass direction at which a video was captured.

5. The method of claim 1, wherein determining that the first video and the second video are associated with the event further comprises determining a similarity score between a portion of audio corresponding to the first video and a portion of audio corresponding to the second video.

6. The method of claim 1, wherein determining that the first video and the second video are associated with the event further comprises determining a similarity score between a brightness level corresponding to a portion of the first video and a brightness level corresponding to a portion of the second video.

7. The method of claim 1, wherein comparing the first video metadata and the second video metadata further comprises comparing title information contained in the first video metadata and the second video metadata, and wherein determining that the first video and the second video are associated with the event further comprises determining a similarity score between the title information of the first video and the title information of the second video.

8. The method of claim 1, further comprising comparing at least one of the first video metadata and the second video metadata with event metadata, wherein a plurality of videos are associated with the event and the event metadata describes the plurality of videos based on video metadata received in connection with each of the plurality of videos.

9. A system for identifying related media content, the system comprising:

at least one hardware processor that is configured to:
receive a first video and first video metadata that describes the first video submitted to a video hosting service over the Internet from a first camera device;
receive a second video and second video metadata that describes the second video submitted to the video hosting service over the Internet from a second camera device;
compare the first video metadata and the second video metadata;
determine whether the first video and the second video are associated with an event based on the comparison, wherein the event is associated with timing information and location information;
group the first video and second video into a plurality of videos associated with the event in response to determining that the first video and the second video are associated with the event; and
receive a request over the Internet from a first remote computing device to present at least the first video;
cause the first remote computing device to present the first video in response to the request to present at least the first video;
cause the first remote computing device to present, during presenting of the first video, image data of one or more videos of the plurality of videos, including the second video, associated with the event other than the first video;
subsequent to causing the first remote computing device to present the first video, receive a third video and third video metadata that describes the third video submitted to the video hosting service over the Internet from a third camera device;
compare the third video metadata, the first video metadata and the second video metadata;
determine that the third video is associated with the event based on the comparison;
in response to determining that the third video is associated with the event, group the third video into the plurality of videos associated with the event;
receive a request over the Internet from a second remote computing device to present at least the third video;
cause the second remote computing device to present the third video in response to the request to present at least the third video; and
cause the second remote computing device to present, during presenting of the third video, image data of one or more videos of the plurality of videos, including the first video and the second video, associated with the event other than the third video.

10. The system of claim 9, wherein the hardware processor is further configured to compare location information and timing information associated with the first video and the second video.

11. The system of claim 10, wherein the hardware processor is further configured to:
determine a first similarity score between the timing information of the first video and the timing information of the second video; and
determine a second similarity score between the location information of the first video and the location information of the second video.

12. The system of claim 10, wherein the location information includes coordinates and a compass direction at which a video was captured.

13. The system of claim 9, wherein the hardware processor is further configured to determine a similarity score between a portion of audio corresponding to the first video and a portion of audio corresponding to the second video.

14. The system of claim 9, wherein the hardware processor is further configured to determine a similarity score between a brightness level corresponding to a portion of the first video and a brightness level corresponding to a portion of the second video.

15. The system of claim 9, wherein the hardware processor is further configured to:
compare title information contained in the first video metadata and the second video metadata; and
determine a similarity score between the title information of the first video and the title information of the second video.

16. The system of claim 9, wherein the hardware processor is further configured to compare at least one of the first video metadata and the second video metadata with event metadata, wherein a plurality of videos are associated with the event and the event metadata describes the plurality of videos based on video metadata received in connection with each of the plurality of videos.

17. A non-transitory computer-readable medium containing computer executable instructions that, when executed by a processor, cause the processor to perform a method for aggregating and presenting multiple videos, the method comprising:

receiving a first video and first video metadata that describes the first video submitted to a video hosting service over the Internet from a first camera device;

receiving a second video and second video metadata that describes the second video submitted to the video hosting service over the Internet from a second camera device;

comparing the first video metadata and the second video metadata;

determining whether the first video and the second video are associated with an event based on the comparison, wherein the event is associated with timing information and location information;

in response to determining that the first video and the second video are associated with the event, grouping the first video and second video into a plurality of videos associated with the event; and receiving a request over the Internet from a first remote computing device to present at least the first video;

causing the first remote computing device to present the first video in response to the request to present at least the first video;

causing the first remote computing device to present, during presenting of the first video, image data of one or more videos of the plurality of videos, including the second video, associated with the event other than the first video;

subsequent to causing the first remote computing device to present the first video, receiving a third video and third video metadata that describes the third video submitted to the video hosting service over the Internet from a third camera device;

comparing the third video metadata, the first video metadata and the second video metadata;

determining that the third video is associated with the event based on the comparison;

in response to determining that the third video is associated with the event, grouping the third video into the plurality of videos associated with the event;

receiving a request over the Internet from a second remote computing device to present at least the third video;

causing the second remote computing device to present the third video in response to the request to present at least the third video; and causing the second remote computing device to present, during presenting of the third video, image data of one or more videos of the plurality of videos, including the first video and the second video, associated with the event other than the third video.

18. The non-transitory computer-readable medium of claim 17, wherein comparing the first video metadata and the second video metadata further comprises comparing location information and timing information associated with the first video and the second video.

19. The non-transitory computer-readable medium of claim 18, wherein determining that the first video and the second video are associated with the event further comprises:
determining a first similarity score between the timing information of the first video and the timing information of the second video; and
determining a second similarity score between the location information of the first video and the location information of the second video.

20. The non-transitory computer-readable medium of claim 18, wherein the location information includes coordinates and a compass direction at which a video was captured.

21. The non-transitory computer-readable medium of claim 17, wherein determining that the first video and the second video are associated with the event further comprises determining a similarity score between a portion of audio corresponding to the first video and a portion of audio corresponding to the second video.

22. The non-transitory computer-readable medium of claim 17, wherein determining that the first video and the second video are associated with the event further comprises determining a similarity score between a brightness level corresponding to a portion of the first video and a brightness level corresponding to a portion of the second video.

23. The non-transitory computer-readable medium of claim 17, wherein comparing the first video metadata and the second video metadata further comprises comparing title information contained in the first video metadata and the second video metadata, and wherein determining that the first video and the second video are associated with the event further comprises determining a similarity score between the title information of the first video and the title information of the second video.

24. The non-transitory computer-readable medium of claim 17, wherein the method further comprises comparing at least one of the first video metadata and the second video metadata with event metadata, wherein a plurality of videos are associated with the event and the event metadata describes the plurality of videos based on video metadata received in connection with each of the plurality of videos.

* * * * *